United States Patent [19]

Hasegawa et al.

[11] Patent Number: 4,478,716

[45] Date of Patent: Oct. 23, 1984

[54] MIXED-BED DEVICE FOR PRODUCING PURE WATER

[75] Inventors: Tsuneo Hasegawa, Shimouchikawa; Kiyoharu Nakahara, Nara; Seitaro Hasegawa, Ibaragi, all of Japan

[73] Assignee: Seisu Kogyo Co., Ltd., Japan

[21] Appl. No.: 458,284

[22] Filed: Jan. 17, 1983

[30] Foreign Application Priority Data

Mar. 2, 1982 [JP] Japan ................... 57-33186

[51] Int. Cl.³ ............................................. B01D 15/04
[52] U.S. Cl. .................................................. 210/289
[58] Field of Search ..................... 210/686, 289–291

[56] References Cited

U.S. PATENT DOCUMENTS

| | | | |
|---|---|---|---|
| 2,364,775 | 12/1944 | Brice | 210/291 |
| 2,627,503 | 2/1953 | Anderson | 210/289 |
| 2,776,258 | 1/1957 | Gilliland | 210/686 |
| 3,009,577 | 11/1961 | Gugeler | 210/289 |
| 3,276,588 | 10/1966 | Nehrbass et al. | 210/289 |
| 3,391,707 | 7/1968 | Riley et al. | 210/289 |
| 3,747,768 | 7/1973 | Barrera | 210/289 |
| 4,200,536 | 4/1980 | Kaufman | 210/289 |

Primary Examiner—Ivars C. Cintins
Attorney, Agent, or Firm—Hauke and Patalidis

[57] ABSTRACT

A mixed-bed device for producing pure water for use in the electronic industry, the pharmaceutical industry, etc., comprises a water collector which is shaped to spread along the bottom of a container and which has water collecting apertures positionable as substantially uniformly distributed over the bottom.

3 Claims, 18 Drawing Figures

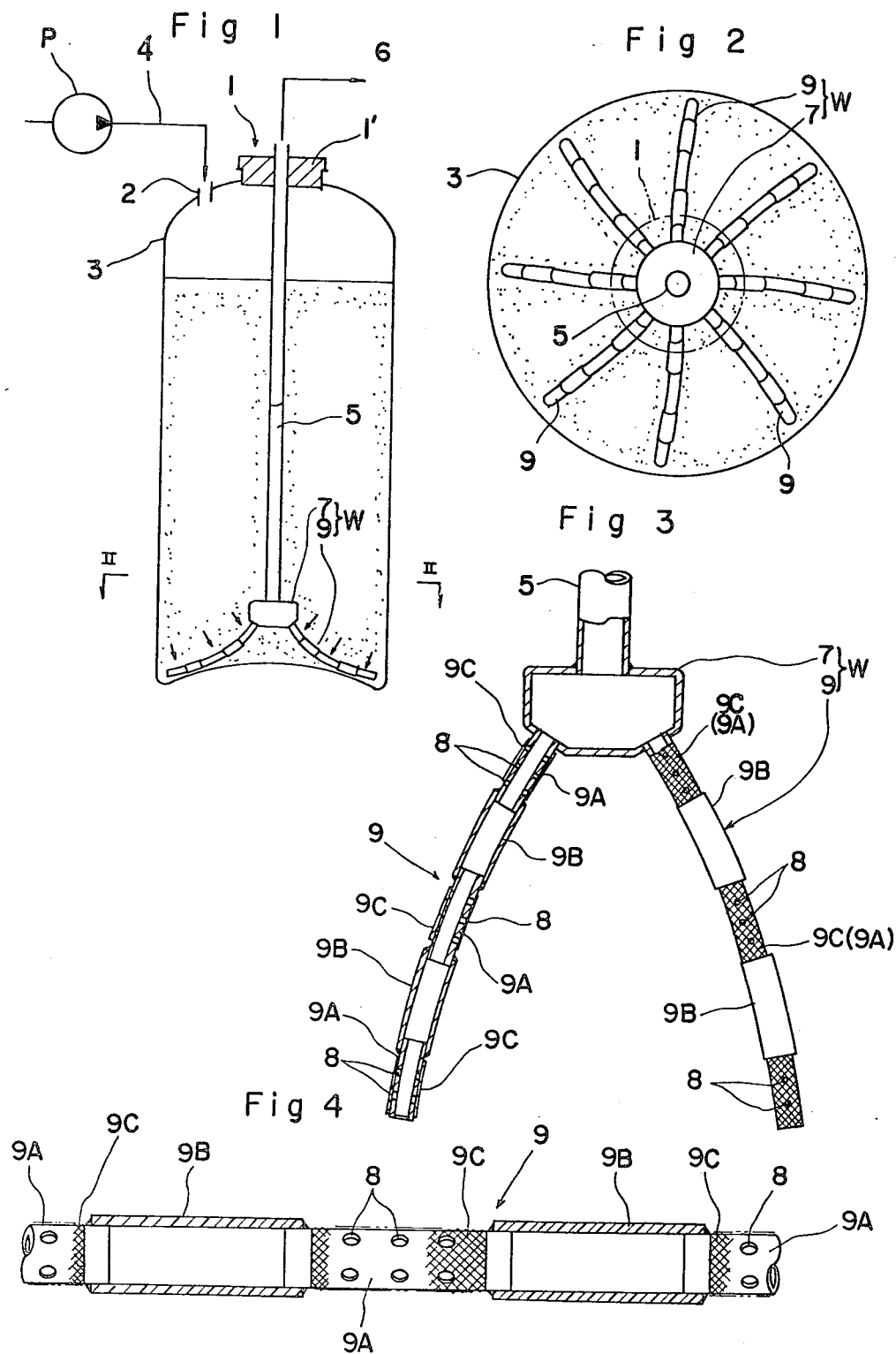

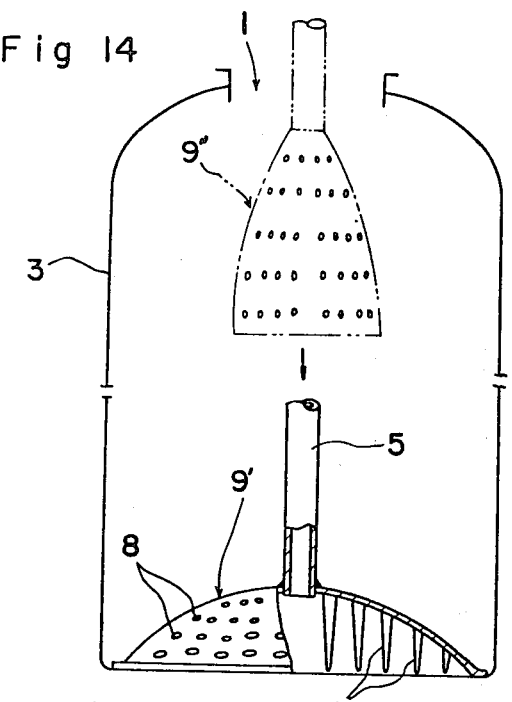
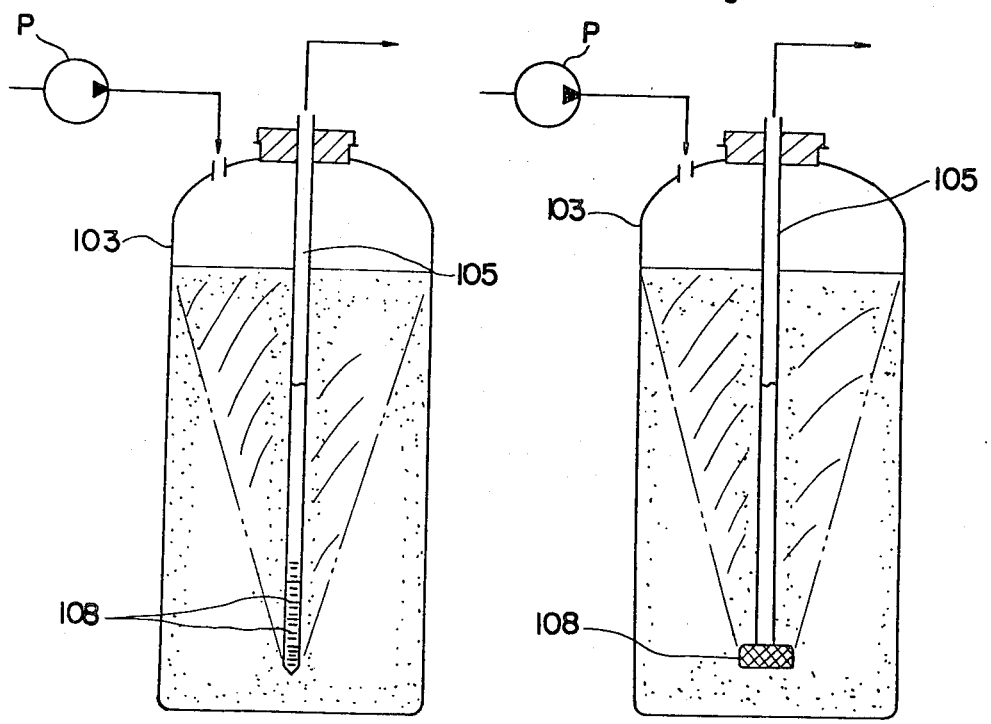

MIXED-BED DEVICE FOR PRODUCING PURE WATER

BACKGROUND OF THE INVENTION

1. Field of the Invention

The present invention relates to a mixed-bed device of the non-regeneration type for producing pure water for use in the manufacture of electronic parts, pharmaceuticals, etc. by removing salts, free acids, bases and the like from a supply of water. The term "mixed-bed device for producing pure water" herein used refers to a device of the above-mentioned type.

2. Description of the Prior Art

The container of a mixed-bed device for producing pure water is filled with grains (for example of ion exchange resin) for forming pure water from usual water or like starting water. Starting water is supplied to an upper portion of the container under pressure and processed into pure water while flowing though the granular material toward the bottom of the container. The pure water is collected via a water collecting tube inserted into the container through an upper opening of the container.

With reference to FIGS. 15 and 16, water collectors for conventional mixed-bed devices for preparing pure water comprise a water collecting tube 105 directly formed in its lower end portion with a multiplicity of water collecting apertures in the form of slits 108 having a width smaller than the grain size of the granular material (FIG. 15), or a perforated strainer 108' attached to the lower end of a water collecting tube 105 and having a Saran net wound therearound (FIG. 16). In either case, the water collector is disposed at only one location in the inner lower portion of the container, for example, at the center.

Accordingly the starting water supplied under pressure to an upper interior portion of the container through an inlet tends to flow the shortest distance between the container upper portion and the water collector due to the resistance to the flow. Consequently the zone of contact between the starting water flowing toward the water collecting portion and the granular material is in the form of a cone having the base at the interior upper portion of the container and the vertex at the water collecting portion. We have found it impossible, for this reason, to effectively use the whole amount of granular material charged in the container and therefore to achieve a high pure water collection efficiency because of a limitation on the amount of pure water that can be collected with a single charge of granular material. We have further found that the starting water tends to remain between the grains which are positioned outside the contact zone, consequently promoting growth of a large amount of bacteria.

Furthermore, the position of the water collector which is limited imposes a limitation on the sum of aperture areas to give great resistance to the collection of water, consequently necessitatng a pump of increased discharge pressure and pressure-resistant container and parts.

SUMMARY OF THE INVENTION

An object of the present invention is to reduce the resistance to the collection of water, to render the granular material or grains for forming pure water usable with an improved efficiency and to inhibit fungi and bacteria within the container to the greatest possible extent.

To eliminate the foregoing drawbacks, the present invention provides a mixed-bed device for producing pure water having a bomb-shaped container of synthetic resin for accommodating pure water forming grains, the container being formed at its upper portion with a constricted opening and a water supply inlet, a closure provided at the opening, a water collecting tube extending into the container through the closure to a bottom portion of the container, and a water collector attached to a lower portion of the water collecting tube and formed with a plurality of water collecting apertures, the device being characterized in that the water collector is shaped to spread along the bottom of the container.

Because the water collector is so constructed as stated above, the interior of the container is made substantially uniform in the resistance to the flow of water, with the result that the starting water supplied to the upper portion of the container flows through the granular material toward the water collecting apertures of the water collector which is spread along the bottom of the container. This enlarges the zone of contact between the granular material with the starting water flowing toward the water collector almost to the entire mass of the granular material, increasing to the greatest possible extent the amount of pure water that can be collected with use of a single charge of the granular material. Further since no pure water is retained among the grains in the vicinity of the bottom of the container, the likelihood that fungi and bacteria will grow in large amounts in stagnant pure water can be eliminated.

When the water collector is to be used for conventional mixed-bed devices for producing pure water, it is desirable to render the collector placeable into and out of the container through its opening and to make the collector spreadable along the bottom of the container, because the main body of the container for such devices is in the form of a bomb which is resistant to internal pressure and in which the opening portion has a smaller cross sectional area than the other container portion. The container is thus bomb-shaped in order to give the container sufficient strength to withstand the pressure of water supply and thereby assure safety because the container is molded of synthetic resin (such as FRP) having lower strength than metals to render the container lightweight and avoid release of metal ions within the container. The bomb-shaped container is further suited to transport and handling. The water collector of the mixed-bed device of the present invention have the advantage of being usable for such conventional containers.

Other objects and advantages of the invention will become apparent from the following description.

BRIEF DESCRIPTION OF THE DRAWINGS

FIG. 1 is a schematic front view in vertical section showing a mixed-bed device of the invention for producing pure water;

FIG. 2 is a view in section taken along the line II—II in FIG. 1;

FIG. 3 is an enlarged front view partly broken away and showing a water collector;

FIG. 4 is an enlarged view of a flexible tube useful for the water collector;

FIGS. 5 to 11, 13 and 14 are enlarged views showing other water collectors embodying the invention;

FIGS. 15 and 16 are schematic front views in vertical section showing conventional mixed-bed devices for producing pure water;

DESCRIPTION OF THE PREFERRED EMBODIMENTS

Figure 5:
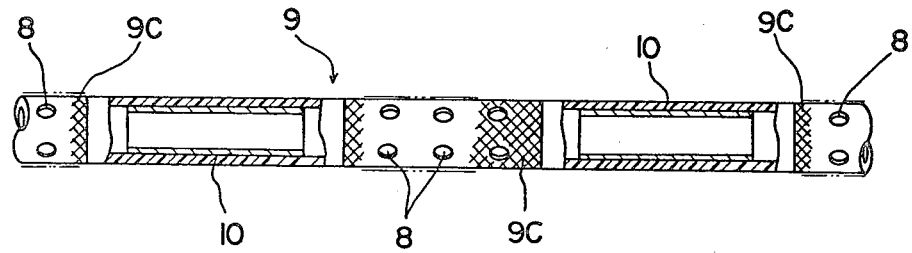

FIG. 1 shows a mixed-bed device embodying the invention for producing pure water which comprises a bomb-shaped container 3 i.e. said container being tubular with a bottom wall, a cylindrical body portion and a domed upper portion, said domed upper portion having an opening 1 and a water supply inlet 2. The opening 1 in the domed upper portion of the container 3 has a smaller cross sectional area than the body portion of the container. The water supply inlet 2 is in communication with a water supply pipe 4 provided with a water supply pump P. The container 3 is filled with a regenerated ion exchange resin, as an example of granular material for forming pure water, from starting water which is supplied to the container via the inlet 2 under pressure. A water collecting tube 5 is inserted in the container 3 through the opening 1 for collecting the pure water passing through the ion exchange resin and reaching the bottom of container or the neighborhood thereof. A water discharge pipe 6 is connected to the upper end of the water collecting tube 5 in communication therewith.

With reference to FIGS. 2, 3 and 4, a water collector W provided at the lower end of the water collecting tube 5 has a contour larger than the cross section of the opening 1. The water collector W comprises a plurality of flexible tubular members 9 which can be arranged closely to an overall size smaller than the opening in cross section but are spreadable in a radial arrangement upon coming into contact with the bottom of the container 3, and a hollow columnar header 7 having a diameter smaller than the cross section of the opening 1. The flexible tubular member 9 are connected to the header 7 in communication therewith and arranged circumferentially of the header 7 at a suitable spacing. The collector W illustrated has eight tubular members 9.

The container 3, the water collecting tube 5 and the hollow header 7 are each made of a synthetic resin such as vinyl chloride or polyethylene.

The flexible tubular member 9 comprises a plurality of tube segments 9A . . . made of a hard, i.e. substantially rigid, resin and having water collecting apertures 8 . . . , tube segments 9B . . . made of a soft, i.e. substantially flexible, resin and interconnecting these tube segments 9A, 9A, and water-permeable filter membranes 9C . . . such as Saran netting wound around the hard resin tube segments 9A . . . .

The tubular member 9 of the above construction is flexible and prevents the ion exchange resin from entering the tubular member 9 while permitting free flow of water through the water collecting apertures.

As the water collecting tube 5 having the water collector W is inserted into the container 3 through the opening 1, the flexible tubular members 9 initially suspending from the header 7 come into contact with the bottom surface of the container 3, whereupon the tubular members 9 turn radially outward. When the water collector W reaches a specified level or depth, the flexible tubular members 9 . . . are already spread in a radial arrangement over the bottom surface as seen in FIG. 2. If the water collecting tube 5 is rotated at this time, the tubular members 9 . . . can be spread to the desired position. A specified quantity of regenerated ion exchange resin is then placed in through the water inlet 2, whereby the flexible tubular members 9 . . . are fixed in position. Starting water is supplied through the inlet 2 to collect pure water through the water collecting tube 5.

After the ion exchange resin has been saturated, water is reversely passed through the container 3 via the water collecting tube 5 to draw off the resin from the water inlet 2. The water collecting tube 5 is also easily removable from the container 3. Indicated at 1' is a closure member for closing the opening.

The device of the invention thus constructed for producing pure water and a conventional device for producing pure water were tested with the result listed in the following table.

TABLE

|  | Prior art | This invention |
|---|---|---|
| Rate of treatment (m³/h) | 2.5 | 2.5 |
| Discharge pressure of water supply pump (kg/cm²) | 5 | 1.7 |
| Output of motor for water supply pump (kw) | 3.7 | 0.75 |
| Pressure of pure water at outlet (kg/cm²) | 1.1 | 1.4 |
| Pressure loss kg/cm²) | 3.9 | 0.3 |
| Ratio of amount of pure water collected per cycle | 100 | 170 |

The result indicates that the device of the invention produces pure water in 1.7 times the amount obtained by the conventional device per cycle of ion exchange resin. Whereas the starting water flowing toward the water collector of the conventional device comes into contact with ion exchange resin in a conical zone, the above result indicates that the contact zone of the present device is approximately in the form of a column having a much larger size and provided by nearly the whole mass of the ion exchange resin charged to achieve a high ion exchange efficiency between the starting water and the resin.

The fact that the starting water flowing toward the water collector comes into contact with the granular material for forming pure water in a zone which almost covers the entire mass of the material serves to inhibit the growth of large amounts of fungi and bacteria due to the retention of the starting water. In the electronic industry, this eliminates from water such microorganisms that would deposit in fine latticework as in VLSI's for the manufacture of products in high yields and with improved quality. The above feature further facilitates production of pyrogen-free water for use in manufacturing pharmaceutical products.

The above test result also reveals a reduction in the resistance of the water collector to the flow of water. This makes it possible to simplify the overall apparatus including the water supply pump and motor and to achieve savings in energy. The above advantage is attributable to the fact that the water collector can be made larger than conventionally to result in an increased overall aperture area for the collection of water.

Figure 17:
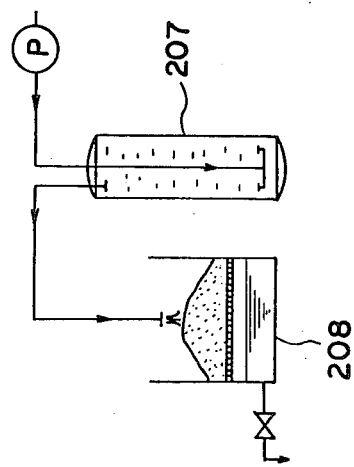
FIG. 17 is a diagram showing how to draw off ion exchange resin after use.

With reduced resistance to the collection of water by the water collector, an increased amount of water can be passed through the water collector, so that used ion exchange resin can be discharged from a pure water producing device 207, for example, to a resin tank 208 with an improved efficiency, and the whole amount of used resin can be discharged from the device with greater ease. FIG. 17 shows how the used ion exchange resin is withdrawn from the device.

Figure 18:
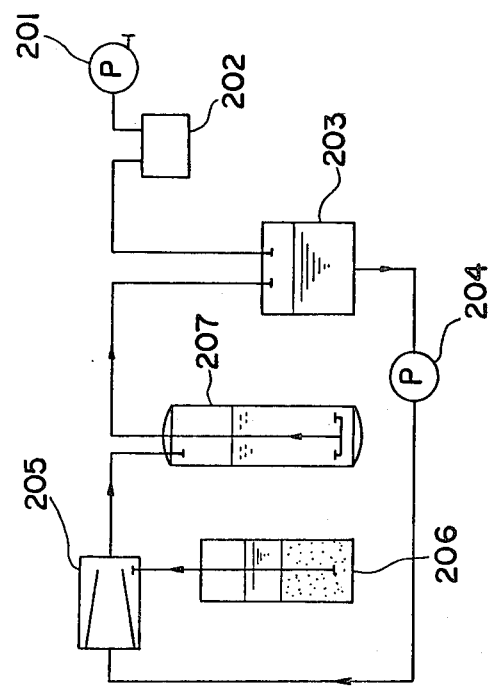
FIG. 18 is a diagram showing a novel system for filling ion exchange resin into the present device.

The increased water collecting capacity of the water collector further permits use of a novel filling system as shown in FIG. 18.

For filling ion exchange resin into the device indicated at 207, a vacuum pump 201 and a pump 204 are operated first, whereupon pure water flows from a pure water storage tank 203 into the pure water producing device 207 through the pump 204 and then through an ejector 205, and the tank 203 is subjected to a reduced pressure. The pure water further passes through the water collector within the device 207 and returns to the tank 203. A trap 202 is provided between the vacuum pump 201 and the pure water storage tank 203 to prevent pure water from flowing into the vacuum pump 201.

When a cock on a regenerated ion exchange resin container 206 is opened, the ejector 205 functions under the forward pressure of the pump 204 and also by the action of the vacuum pump 201, charging a regenerated ion exchange resin from the container 206 into the device 207 along with pure water. The pure water only passes through the water collecting tube and returns to the storage tank 203.

The water collector of the invention having a high water collecting capacity and incorporated into the pure water producing device makes it possible to give the container of the device an internal negative pressure reliably. This had led directly to the use of the filling system described.

While a mixture of refreshed ion exchange resin and pure water is conventionally poured in small portions into the container through a large-mouthed funnel placed at the water supply inlet of small diameter for filling the container, the novel filling system has the following advantages over the conventional method.

(1) The filling time is ⅓ the period of time conventionally required.

(2) Since water does not remain in the device during filling, the ion exchange resin composed of a cation exchange resin and an anion exchange resin and thoroughly mixed together will not separate again.

(3) Because the regenerated ion exchange resin is in no way exposed to air during filling, the pure water obtained is made free of fungi and bacteria to a remarkable extent.

(4) The regenerated ion exchange resin, which is exposed to pure water only during filling, can be charged free from dust and like foreign matter without necessitating skill heretofore required.

The term "grains (or granular material) for forming pure water" herein used refers not only to an ion exchange resin but also to activated carbon, sand, etc.

The present water collector is usable also for various purifying apparatus for removing colors, odors, etc.

The water collector of the present device described with reference to the foregoing embodiment may be modified as follows.

(1) As shown in FIG. 5, the flexible tubular member 9 constituting the water collector W is entirely made of a soft resin, and tubular pieces 10 of hard resin are inserted in required portions of the member 9.

Figure 6:
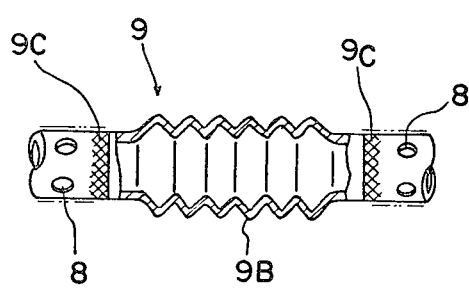

(2) As shown in FIG. 6, the soft resin tube segment 9B of the flexible tubular member 9 is in the form of bellows.

Figure 7:
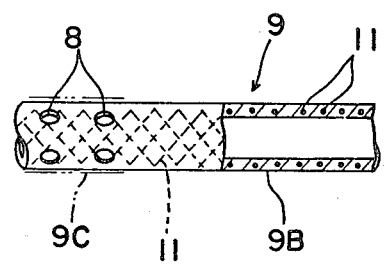

(3) As shown in FIG. 7, reinforcing fibers 11 are embedded in the soft resin tube segment 9B.

Figure 8:
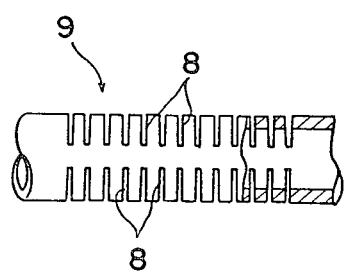

(4) As shown in FIG. 8, the water collecting apertures 8 ... formed in the flexible tubular member 9 are in the form of slits having a width smaller than the grain size of the ion exchange resin. In this case, the water-permeable filter membrane 9C is unnecessary.

Figure 9:
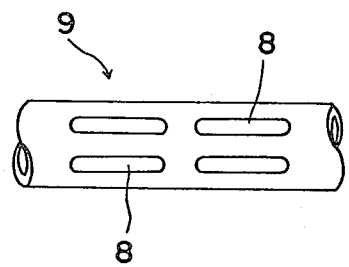

(5) As shown in FIG. 9, the water collecting aperture 8 is in the form of a slit extending axially of the flexible tubular member 9.

Figure 10:
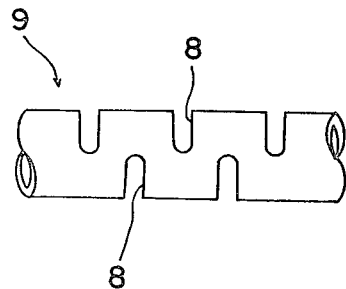

(6) As shown in FIG. 10, the water collecting aperture 8 is in the form of a slit extending circumferentially of the flexible tubular member 9.

Figure 11:
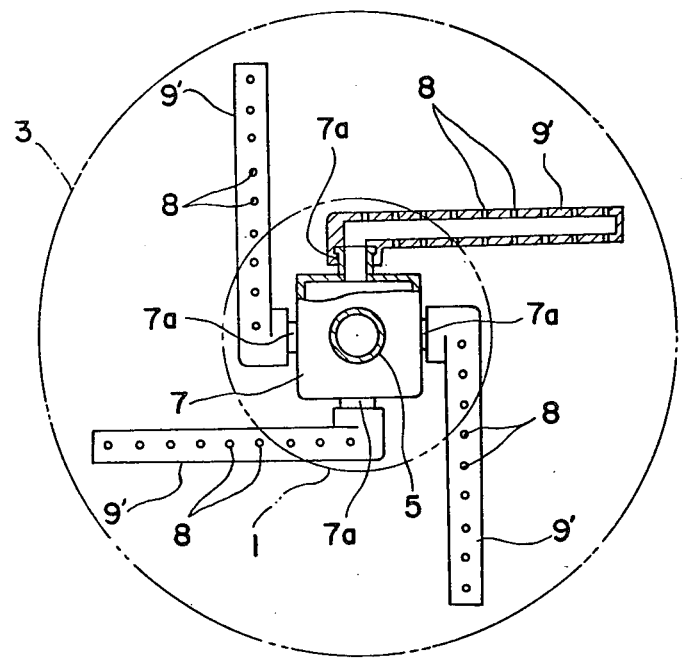
Figure 12:
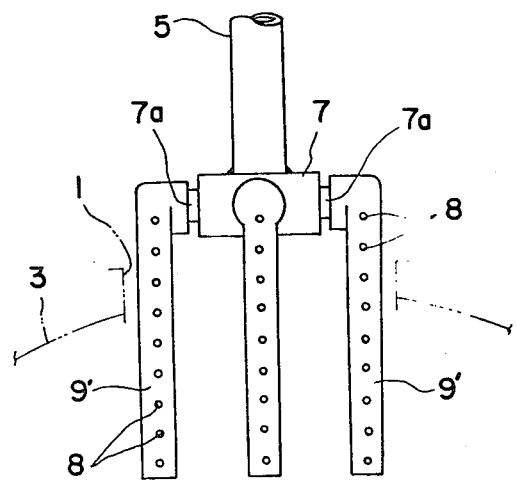
FIG. 12 is a front view of FIG. 11.

(7) FIGS. 11 and 12 show a water collector W comprising a header 7 and a plurality of hard resin, i.e. substantially rigid, tubular members 9' which are pivotally movable and spreadable to a radial arrangement along the bottom of the container 3. The header 7 is attached to the lower end of the water collecting tube 5 and is in the form of a hollow square column or sphere smaller than the cross section of the opening 1. A tubular connector 7a extends laterally outward from each of the four sides of the header 7. Each of the hard resin tubular members 9' ... having a multiplicity of water collecting apertures 8 ... is pivotably fitted around and retained by the tubular connector 7a. When the collector W is inserted into the container 3, the tubular members 9' ... are in a suspended position. The collector W is then entirely rotated with the tubular members 9' ... in contact with the bottom of the container 3, whereby the members 9' are spread from the state in which the assembly is smaller than the opening in cross section to a radial arrangement in which the assembly is larger than the cross section of the opening.

Figure 13:
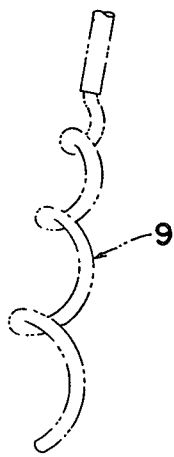

(8) FIG. 13 shows a water collector W comprising a flexible tubular member which has a multiplicity of water collecting apertures 8 ... and is shaped to a spiral form.

(9) FIG. 14 shows a water collector W in the form of a flexible bowl which has a multiplicity of water collecting apertures 8 ... and is intimately fittable to the bottom surface of the container. The bowl 9" is internally provided with a multiplicity of reinforcing projections 10 adapted to bear on the bottom surface of the container 3. The flexible bowl 9" may be made hollow.

(10) The tubular member 9 is connected directly to the water collecting tube 5.

(11) A water collector W including a plurality of hollow headers 7.

We claim:

1. In a mixed-bed device for producing pure water, said device comprising a tubular container, a closure member, a water collecting tube and a water collector having a plurality of apertures, wherein said tubular container has a bottom wall, a cylindrical body portion and a domed upper portion, said domed upper portion of said container has a water supply inlet and a constricted opening formed therein, said closure member is removably inserted in said constricted opening, said water collecting tube extends into said container through said closure member such that an end of said water collecting tube is disposed proximate said bottom wall of said container, and said water collector is attached to said end of said water collecting tube, the improvement comprising said water collector being expandable from a relatively narrow configuration, wherein said water collector is insertable into said container through said constricted opening in said domed portion, to a relatively wide configuration, wherein said water collector has a width substantially equal in size to the inner diameter of said cylindrical body portion of said container, and wherein said expandable water collector comprises a header and a plurality of flexible tubular members, each of said flexible tubular members protrudes from a wall of said header, said flexible tubular members are substantially evenly spaced-apart, said flexible tubular members are in fluid communication with said header, and each of said flexible tubular members comprises a plurality of substantially rigid tube segments and a plurality of flexible tube segments, said flexible tube segments interconnecting said rigid tube segments.

2. The device of claim 1 wherein said flexible tube segments are provided with reinforcing fibres.

3. The device of claim 1 wherein said flexible tube segments are provided with a bellows configuration.

* * * * *